United States Patent [19]

Moyne

[11] 3,824,703
[45] July 23, 1974

[54] APPARATUS FOR THE BATCH TREATMENT OF SOLID MATERIAL

[75] Inventor: Paul Moyne, Benite, France

[73] Assignee: Rhone-Poulenc S.A., Paris, France

[22] Filed: Apr. 6, 1973

[21] Appl. No.: 348,521

[30] Foreign Application Priority Data
Apr. 7, 1972  France ............................... 72.12280

[52] U.S. Cl. .................... 34/130, 34/108, 34/138, 432/108, 34/182
[51] Int. Cl. ........................................... F26b 11/02
[58] Field of Search ........ 34/63, 108, 109, 130–132, 34/137–139, 165–168, 173–176, 182–183; 432/103, 108

[56] References Cited
UNITED STATES PATENTS

| 259,993 | 6/1882 | Andrew .............................. 34/138 |
| 1,469,294 | 10/1923 | Daman .............................. 432/108 |
| 2,744,338 | 5/1956 | Rothe ................................ 34/136 |
| 3,303,578 | 2/1967 | Rockwell et al. .................... 34/182 |

Primary Examiner—Kenneth W. Sprague
Assistant Examiner—James C. Yeung
Attorney, Agent, or Firm—Cushman, Darby & Cushman

[57] ABSTRACT

Apparatus for the batch treatment of solid material, for example for drying the material, in which a chamber is rotatable about a substantially horizontal axis and is divided into two compartments by a horizontal gas permeable partition. A pipeline for the introduction and/or withdrawal of gas or vapour opens into at least one of the compartments and an endless screw conveyor is mounted within the chamber adjacent at least one longitudinal wall thereof. At least one tube for the passage of solid material communicates with the interior of the chamber adjacent the endless screw and a supply and withdrawal conduit are positioned above and below the chamber, respectively, at locations whereby, when said chamber is rotated to one position, said at least one tube can be connected to receive material to be treated from said supply conduit, and, when said chamber is rotated to another position, said at least one tube can be connected to feed treated material to said withdrawal conduit.

10 Claims, 6 Drawing Figures

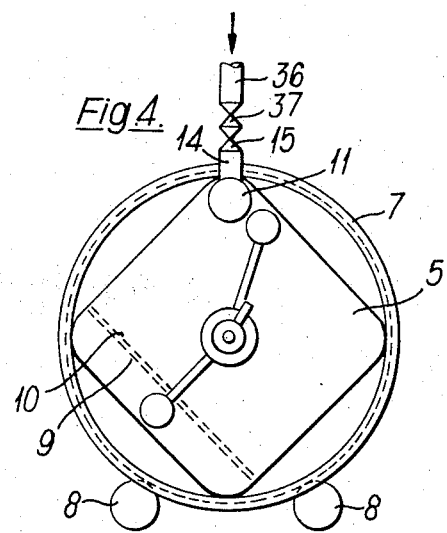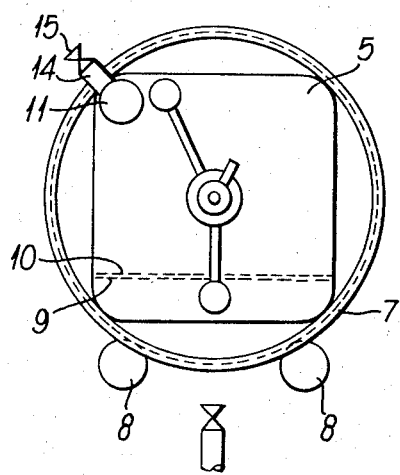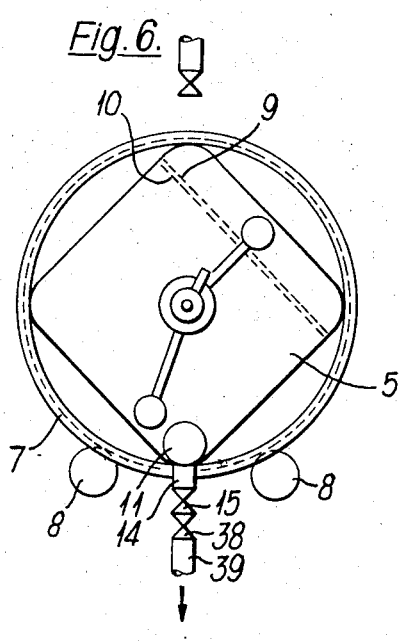

APPARATUS FOR THE BATCH TREATMENT OF SOLID MATERIAL

The present invention relates to apparatus for the batch treatment of a mass of solid materials by a stream of gas, or vapour especially in order to dry them or to deodorise them.

The apparatus which are most frenquantly used for this treatment comprise a fixed chamber which is divided by a grid covered with a cloth into two compartments through which a stream of gas (which is hot or cold depending on the requirements) passes, this gas being generally air. The operations of distributing the products which has been loaded and of unloading is generally performed manually. These operations are often long, laborious and dangerous (contact with toxic vapours). Moreover, the products are not homegenised during the treatment, which prolongs the duration of the treatment and often has a detrimental effect on the quality of the products obrained. Attempts have been made to equip these apparatus with stirring devices, but they are then no longer suitable for the treatment of fragile particulate products, because they break the crystals thereof and thus lead to products of inferior quality.

According to the present invention, there is provided apparatus for the batch treatment of solid materials, such apparatus comprising, a closed chamber rotatable about a substantially longitudinal axis, extending transverse an end wall of the chamber a gas permeable partition dividing the chamber into two compartments, at least one pipeline for gas or vapour opening into at least one of the compartments, an endless screw conveyor mounted within the chamber adjacent a longitudinal wall thereof.

With such an apparatus the operations of loading distribution, drying, homogenisation and unloading of the product can follow one another with practically no manual intervention and can be carried out as a function of a pre-established programme, for example stored in the memory of a programmer. The solid materials to be treated with a stream of gas, can, for example, be either finely divided or, on the other hand, in the form of friable crystals or granules.

In order that the invention will be better understood the following description is given, by way of example only, reference being made to the accompanying drawings, in which:

FIGS. 4, 5 and 6 are views from the right of the apparatus, respectively in the loading, drying and unloading positions.

Figure 1:
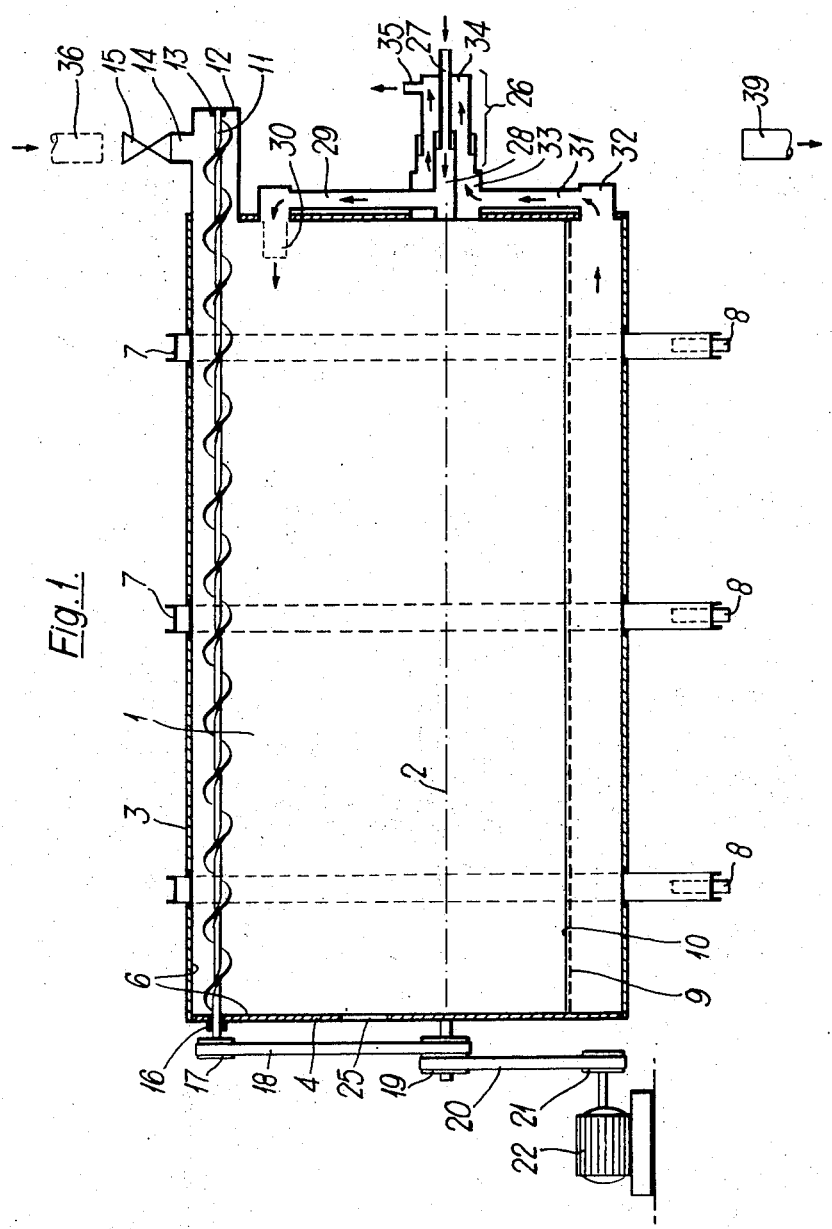
FIG. 1 is an elevation, in cross-section, taken along the line A B C D E of FIG. 3, of one embodiment of apparatus according to the invention.
Figure 2:
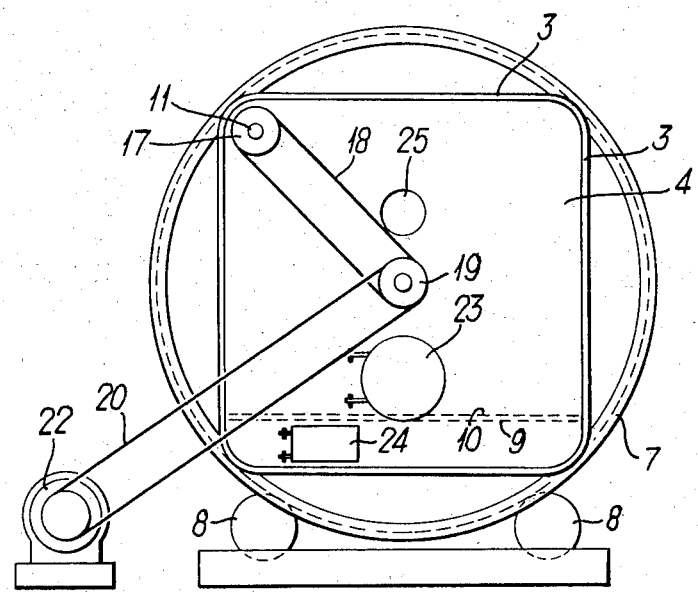
FIG. 2 is a view from the left of the apparatus represented in FIG. 1.
Figure 3:
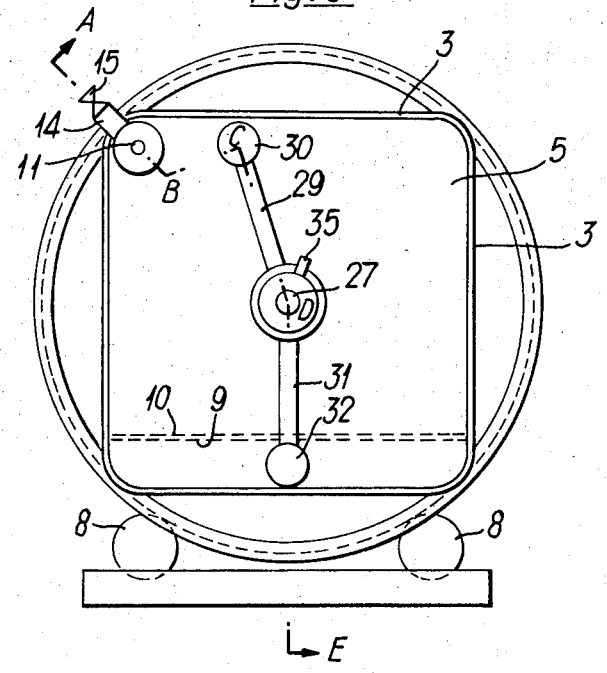
FIG. 3 is a view from the right of the apparatus represented in FIG. 1.

The apparatus illustrated comprises a closed chamber 1 which is capable of rotating about a horizontal axis of rotation 2. The chamber 1 has a constant cross-section which is substantially square or rectangular and the generatrices being parallel to the axis of rotation which coincides with the axis of symmetry. The longitudinal walls 3 of the chamber are identical and are situated between two vertical end walls 4 and 5. All these walls are covered with a heat insulator 6 and can optionally be heated.

The means for rotating the chamber 1 about its axis comprise running rings 7 firmly fixed to the chamber, revolving on friction rollers 8, some of which can be connected to a motor (not shown). Advantageously, in order to improve the grip of the rolling tracks on the friction rollers, the latter can be covered with rubber tyres. It is also possible to replace the rolling tracks and the friction rollers by ring gears and sets of pinions.

The chamber 1 is divided by gas permeable partition 9 parallel to one of the faces 3, into two uneven compartments, in a ratio which is generally less than one-fifth. This grid partition is a rigid grid, covered with a removable cloth which is chosen as a function of the product to be treated and of the operation to be carried out.

In one of the angles formed by two adjacent longitudinal walls of the chamber, there is located an endless screw conveyor 11 which extends parallel to the axis 2 over the entire length of the chamber, between the end walls 4 and 5.

The shaft of the endless screw passes through the face 4 in a leakproof manner and it is supported on the outside by a bearing 16. At the end of the shaft, a pulley 17 enables the endless screw conveyor to be driven by means of a transmission device comprising, for example, a fixed motor 22 equipped with a pulley 21, an intermediate pulley 19 mounted to idle on the axis of rotation of the apparatus and belts 18 and 20. The motor can revolve in one direction or in the other, which makes it possible to drive the screw conveyor 11 in the desired direction.

The endless screw passes through the face 5 and is extended inside a tube 12 at the end of which it is supported by a bearing 13. A substantially radial tube 14 is mounted on the tube 12, and is provided with a means of closing it such as a stop valve 15. The valve 15 is preferably controlled pneumatically, the compressed air pipelines being connected to a revolving distributor which is not shown, located on the axis 2.

A set of pipelines provided with rotary couplings 26 located on the end wall 5 enables a gas to be introduced into the chamber 1 on one side of the grid 9 and to remove it on the other side. This set comprises a fixed pipeline 27 and a coaxial rotating pipeline 28, a first side pipeline 29 and the multiple jet 30, near the endless screw conveyor for introducing the gas. The set also includes a second side pipeline 31 connected to the smaller compartment by an orifice 32, a rotating pipeline 33 and a fixed coaxial pipeline 34 followed by a pipeline 35 for removing the gas. The pipelines 27 and 28 on the one hand and the pipelines 33 and 34 on the other hand are connected to one another by a revolving leakproof coupling device or joint of a type which is in itself known.

A manhole 23 above the grid, a door 24 below the grid and an inspection hole 25 advantageously complete the equipment of the apparatus.

The apparatus according to the invention functions in the following way, for example, for drying a moist product by means of a hot gas.

The apparatus is placed in the position represented in FIG. 4, the tube 14 and the pneumatic valve 15, firmly fixed to the chamber, pointing upwards. Valve 15 is connected to a fixed supply conduit 36, pointing downwards and equipped with a valve 37. The conduit 36 can preferably be lowered automatically into the loading position, and can then be slightly raised during the rotation of the chamber. The valves 15 and 37 are opened, for example by pneumatic control, and the endless screw conveyor is rotated simultaneously, which makes it possible automatically to introduce the moist product into the chamber. When the loading of the apparatus is complete, the valves 15 and 37 are closed, the conduit 36 is raised and the driving of the endless screw conveyor is stopped.

The apparatus is then rotated, for example for 2 or 3 revolutions, in order to distribute the moist product automatically over the entire surface area of the grid, and the apparatus is stopped in the position represented in FIG. 5 (the grid being horizontal and supporting the product).

The drying operation is begun and consists of introducing a hot gas, for example air, by opening a valve (not shown) located on the tube 27. This gas passes through the mass to be dried in a downwards direction and is then removed, moist, via the orifice 32.

It is advantageous periodically to homogenize the product during the drying, and this is achieved automatically by rotating the apparatus a few times.

When the drying is complete, the supply of the hot gas is stopped and the apparatus is pivoted into the position represented in FIG. 6, the tube 14 and the pneumatic valve 15 pointing downwards. Valve 15 is connected to a fixed withdrawal conduit 39, pointing upwards and equipped with a valve 38. The valves 15 and 38 are opened, for example by pneumatic control, and the endless screw conveyor is simultaneously rotated, in the opposite direction to the direction used for the loading, which makes it possible automatically to remove the dry product from the chamber.

When the apparatus is empty, the rotation of the endless screw conveyor is stopped, the valves 15 and 38 are closed, the conduit 39 is lowered and the apparatus is pivoted into the position which permits reloading.

The apparatus according to the invention possesses various advantages:

It enables the various stages of a drying process, and more generally of a process for treating solid pulverulent materials with gases, to be rendered automatic. These various stages can be programmed, controlled and checked by remote control.

It enables a product to be treated in a controlled gaseous atmosphere, from the loading to the unloading inclusive, which is very important if the product to be treated or the treating fluid gives off a toxic, evil-smelling, lacrymatory or corrosive atmosphere.

It prevents the crystals of the treated products, which are often fragile, from being damaged.

Since the products are periodically homogenized, the duration of the treatment is reduced and the quality of the product obtained is all the less altered thereby.

The apparatus according to the invention can be used as a drier/mixer or even as a simple mixer. Thus it is possible first to dry a product and then to introduce thereafter, for example, a dyestuff or a pigment and to mix the two products intimately.

This apparatus can also be used for drying a product in vacuo, the longitudinal walls 3 of the chamber 1 being then advantageously heated. It suffices, for example, to seal the pipeline 27 and to evacuate the apparatus via the pipeline 35 or even to evacuate it via the two pipelines 27 and 35. In this application, the apparatus can contain only one single pipeline 29 or 31 opening into at least one of the compartments of the chamber 1.

It is possible to replace the running rings and friction rollers by bearings at the end of a shaft. It is also possible to install a combination consisting of the tubes 12 and 14 and the valve 15 at each end of the endless screw and to place the conduit 39 in a position diagonally opposite to the conduit 36. Then, since the endless screw conveyor always revolves in the same direction, each of the loading and unloading operations will now take place via a different collection of tubes. With two collections of tubes, it is also possible to use an endless screw conveyor consisting of two parts equipped with opposite-handed threads and connected to a motor which functions in both directions. This device makes it possible to load and unload the apparatus simultaneously via the two collections of tubes.

I claim:

1. Apparatus for the batch treatment of solid materials comprising, in combination:
  a. longitudinal and end walls forming a closed chamber rotatable about a substantially horizontal axis, extending transverse to said end walls;
  b. a substantially horizontal gas permeable partition dividing said chamber into two compartments;
  c. at least one pipeline for gas or vapour opening into at least one of said compartments;
  d. an endless screw conveyor mounted within said chamber adjacent a longitudinal wall thereof, at one particular peripheral location of said wall, the conveyor being rotatable with the chamber so as to remain in this particular location;
  e. at least one tube for the passage of solid material communicating with the interior of said chamber adjacent said endless screw conveyor; and
  f. means for sealing said at least one tube.

2. Apparatus as claimed in claim 1, and further comprising at least one duct located on said axis of rotation of the chamber and revolving leakproof joint connecting said at least one duct to said at least one pipeline.

3. Apparatus as claimed in claim 1, and further comprising a supply conduit positioned above said chamber and a withdrawal conduit positioned below said chamber at locations whereby, when said chamber is rotated to one position, said at least one tube can be connected to receive material to be treated from said supply conduit, and, when said chamber is rotated to another position, said at least one tube can be connected to feed treated material to said withdrawal conduit.

4. Apparatus as claimed in claim 1, wherein said partition is rigid grid covered with a cloth.

5. Apparatus as claimed in claim 1, wherein said chamber is of constant cross-section, the generatrices of the chamber, the partition and the endless screw conveyor being parallel to the axis of rotation and wherein the endless screw conveyor extends over the entire length of the chamber and is spaced from the partition.

6. Apparatus as claimed in claim 5, wherein the cross-section of the chamber is substantially rectangular, and wherein the endless screw conveyor is located in an angle of the rectangle spaced from the partition.

7. Apparatus as claimed in claim 1, wherein the partition is assymetrically disposed in the chamber, whereby one compartment is larger than the other and wherein said endless screw conveyor is located in the larger compartment.

8. Apparatus as claimed in claim 1, wherein the apparatus includes a single tube for the passage of solid material, and wherein the endless screw conveyor extends into said tube, and further comprising means to rotate said conveyor in both directions.

9. Apparatus as claimed in claim 1, wherein the apparatus includes two tubes for the passage of solid material, one at each end of the chamber, and wherein the endless screw conveyor extends into both tubes and further comprising means to rotate said conveyor in one direction only.

10. Apparatus as claimed in claim 1, wherein the apparatus includes two tubes for the passage of solid material, one at each end of the chamber, wherein the endless screw is formed in two parts, one of lefthand pitch and the other of righthand pitch, wherein one part extends into one of said tubes and the other into the other of said tubes, and further comprising means to rotate said conveyor in both directions.

* * * * *